United States Patent
Medeiros et al.

(10) Patent No.: US 12,335,884 B2
(45) Date of Patent: Jun. 17, 2025

(54) NETWORK ENTITY FOR SYNCHRONIZATION OVER A PACKET-BASED FRONTHAUL NETWORK

(71) Applicant: Telefonaktiebolaget LM Ericsson (publ), Stockholm (SE)

(72) Inventors: Eduardo Lins de Medeiros, Bromma (SE); Miguel Berg, Sollentuna (SE); Igor Almeida, Indaiatuba (BR)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 402 days.

(21) Appl. No.: 17/770,660

(22) PCT Filed: Oct. 22, 2019

(86) PCT No.: PCT/SE2019/051039
§ 371 (c)(1),
(2) Date: Apr. 21, 2022

(87) PCT Pub. No.: WO2021/080478
PCT Pub. Date: Apr. 29, 2021

(65) Prior Publication Data
US 2022/0369251 A1  Nov. 17, 2022

(51) Int. Cl.
*H04W 56/00* (2009.01)
*H04L 5/14* (2006.01)
*H04L 27/26* (2006.01)

(52) U.S. Cl.
CPC ......... *H04W 56/001* (2013.01); *H04L 5/1469* (2013.01); *H04L 27/2605* (2013.01)

(58) Field of Classification Search
CPC ............. H04W 56/001; H04W 88/085; H04W 56/0015; H04W 72/0446; H04L 5/1469;
(Continued)

(56) References Cited

U.S. PATENT DOCUMENTS

2013/0039359 A1   2/2013   Bedrosian
2018/0206203 A1   7/2018   Ruffini et al.
(Continued)

FOREIGN PATENT DOCUMENTS

WO   2016145371 A2   9/2016
WO   2017012635 A1   1/2017
(Continued)

OTHER PUBLICATIONS

Author Unknown, "IEEE Standard for Information technology—Telecommunications and information exchange between systems—Local and metropolitan area networks—Specific requirements; Part 3: Carrier Sense Multuple Access with Collision Detection (CSMA/CD) Access Method and Physical Layer Specification," IEEE Standard 802.3, 2005, Piscataway, New Jersey, 2,595 pages.
(Continued)

*Primary Examiner* — Christopher M Crutchfield
(74) *Attorney, Agent, or Firm* — Withrow & Terranova, PLLC

(57) ABSTRACT

A method performed by a network entity is provided. The method comprises obtaining information indicating uplink, UL, and downlink, DL, time periods in the packet-based fronthaul network occupied by Time-Division Duplex, TDD, radio transmissions transmitted and/or received by the one or more second fronthaul network units over its radio interface. The method further comprises scheduling packet-based synchronization messages between at least the one or more first fronthaul network units and the one or more second fronthaul network units over the packet-based fronthaul network based on the obtained information. A network entity is also provided, as well as, computer programs and carriers.

20 Claims, 8 Drawing Sheets

(58) Field of Classification Search
CPC ... H04L 27/2605; H04J 3/0667; H04J 3/0658; H04B 7/2643
See application file for complete search history.

(56) References Cited

U.S. PATENT DOCUMENTS

| | | | |
|---|---|---|---|
| 2019/0116568 A1 | 4/2019 | Fertonani et al. | |
| 2020/0413360 A1* | 12/2020 | Ruffini | H04W 56/0015 |
| 2021/0014085 A1* | 1/2021 | Chen | H04B 17/14 |
| 2021/0195632 A1* | 6/2021 | Jungnickel | H04B 10/1149 |
| 2021/0377936 A1* | 12/2021 | Yuan | H04W 72/27 |

FOREIGN PATENT DOCUMENTS

| | | |
|---|---|---|
| WO | 2017088911 A1 | 6/2017 |
| WO | 2018017468 A1 | 1/2018 |

OTHER PUBLICATIONS

Author Unknown, "IEEE Standard for a Precision Clock Synchronization Protocol for Networked Measurement and Control Systems," IEEE Standard 1588, IEEE Instrumentation and Measurement Society, Jul. 24, 2008, New York, New York, 289 pages.

Author Unknown, "Technical Specification Group Radio Access Network; Evolved Universal Terrestrial Radio Access (E-UTRA); Physical channels and modulation (Release 15)," Technical Specification 36.211, Version 15.4.0, Dec. 2018, 3GPP Organizational Partners, 240 pages.

Chitimalla, et al., "5G Fronthaul-Latency and Jitter Studies of CPRI Over Ethernet," Journal Of Optical Communications and Networking, vol. 9, Issue 2, Feb. 2017, Optical Society of America, pp. 172-182.

Freire, et al., "Analysis of Controlled Packet Departure to Support Ethernet Fronthaul Synchronization via PTP," International Symposium on Precision Clock Synchronization for Measurement, Control, and Communication, Sep. 2018, IEEE, 6 pages.

Mochizuki, et al., "Improving IEEE 1588v2 Clock Performance through Controlled Packet Departures," IEEE Communications Letters, vol. 14, Issue 5, May 2010, pp. 459-461.

Venmani, et al., "On the Role of Network Synchronization for Future Cellular Networks: An Operator's Perspective," IEEE Communications Magazine, Sep. 2016, pp. 58-64.

International Search Report and Written Opinion for International Patent Application No. PCT/SE2019/051039, mailed Nov. 10, 2020, 12 pages.

Extended European Search Report for European Patent Application No. 19949789.2, mailed Apr. 24, 2023, 9 pages.

* cited by examiner

NETWORK ENTITY FOR SYNCHRONIZATION OVER A PACKET-BASED FRONTHAUL NETWORK

This application is a 35 U.S.C. § 371 national phase filing of International Application No. PCT/SE2019/051039, filed Oct. 22, 2019, the disclosure of which is incorporated herein by reference in its entirety.

TECHNICAL FIELD

Embodiments herein relate to synchronization over a packet-based fronthaul network. In particular, embodiments herein relate to a network entity and method therein for synchronizing one or more first fronthaul network units with one or more second fronthaul network units across a packet-based fronthaul network carrying Time-Division Duplex, TDD, radio transmissions. Further, the embodiments herein also relate to a computer program and a carrier.

BACKGROUND

In today's wireless communications networks a number of different technologies are used, such as New Radio (NR), Long Term Evolution (LTE), LTE-Advanced, Wideband Code Division Multiple Access (WCDMA), Global System for Mobile communications/Enhanced Data rate for GSM Evolution (GSM/EDGE), Worldwide Interoperability for Microwave Access (WiMax), or Ultra Mobile Broadband (UMB), just to mention a few possible technologies for wireless communication. A wireless communications network commonly comprises radio base stations providing radio coverage over at least one respective geographical area forming a cell. This is commonly referred to as a Radio Access Network, RAN. The RAN is in turn connected to the core network in the wireless communications network via a so-called backhaul network. Wireless devices, User Equipments (UEs), mobile stations, and/or wireless terminals, are served in the cells by the respective radio base station and are communicating with respective radio base station in the RAN over an air/radio interface. Commonly, the wireless devices transmit data over the air/radio interface to the radio base stations in uplink, UL, transmissions and the radio base stations transmit data over the air/radio interface to the wireless devices in downlink, DL, transmissions.

Another different type of RAN comprise centralized baseband processing units and standalone remote radio units, such as, e.g. Remote Radio Heads, RRHs. The remote radio units may be installed at remote cell sites that may be located up to tens of kilometers away from its baseband processing unit. This type of RAN is commonly referred to as a fronthaul network, and may be connected via optical communications links and intermediate network switches. A fronthaul network typically has rather strict latency requirements, such as, typically below 100 µs total latency including propagation delay and any delay in the intermediate network switches. For 2G/3G/4G wireless communications network, the fronthaul network has typically been implemented using the Common Public Radio Interface, CPRI. CPRI uses time division multiplexing and has built-in synchronization capabilities.

Recently, a packed-based fronthaul network specification, eCPRI, has been developed to improve scalability for 4G/5G fronthaul networks. This specification suggest IEEE 1588-2008—IEEE Standard for a Precision Clock Synchronization Protocol for Networked Measurement and Control Systems, a Precision Time Protocol, PTP, for synchronization of remote radio units. Using this protocol avoids the need for costly Global Navigation Satellite System, GNSS, receivers in every remote radio unit, which otherwise is a requirement. This also has further advantages since GNSS receivers does not work well for indoor remote radio units.

This PTP protocol, or other similar packet-based synchronization protocols, may be used to synchronize fronthaul network units across a fronthaul network. These protocols rely on exchanging timestamped messages and tracking the deviation between a master or reference clock and a slave clock. In an end-to-end measurement mode, the clock adjustment value in PTP may be derived from timestamps exchanged using these packet-based synchronization messages e.g.:
  Sync-message. Transmitted from master unit to slave unit. Multiple Sync-messages may be transmitted prior to a Delay request message.
  Follow-up-message. Transmitted from master unit to slave unit. This is an optional message that depends on the hardware timestamping capabilities of the PTP master.
  Delay request message. Transmitted from slave to master.
  Delay response message. Transmitted from master to slave.

One of the main drawbacks in using this type of protocol is Packed Delay Variation, PDV. PDV occurs because the time to traverse the fronthaul network and the network switches therein may vary between the PTP packets. The PDV in a fronthaul network may dependent on a number of factors, such as, for example, the load in the fronthaul network, the number of hops between the baseband processing unit and the radio unit (e.g. because of the store-and-forward nature of the intermediary network switches in the fronthaul network), and the availability of specific fronthaul network features, such as, packet pre-emption.

PDV may introduce noise in the timing estimates in the fronthaul network, and thus also affect the synchronization accuracy in the fronthaul network. One example of a measurement of the synchronization accuracy is the Timing Alignment Error, TAE, between radio units. The TAE depends on the type of services supported by the fronthaul network. The most advanced services, such as, e.g. spatial multiplexing or transmit diversity, may require a TAE below ±65 ns, while less advanced services, such as, e.g. LTE Time Division Duplexing, LTE-TDD, may work with a TAE below ±1.5 µs. However, localization features, such as, e.g. Observed Time Difference of Arrival, OTDOA, may introduce even stricter requirement on the TAE.

One approach to mitigate PDV, and to ensure a suitable performance in the synchronization plane, is to only have PTP-aware network switches in the fronthaul network. PTP-aware network switches may in this case implement a PTP Transparent Clock or a Boundary Clock. However, this significantly increases the costs in the fronthaul network, in particular, for indoor radio communication networks.

Another approach to mitigate PDV is to use so-called controlled packed departure. In controlled packed departure, the gap between sync packets and other traffic is managed in such a way that the sync packets are not heavily affected by queuing effects, and may be implemented using functionality, such as, e.g. source back-off and pause frames in Ethernet. However, the effectiveness of such solutions depends of the support of these features by the underlying hardware.

A further approach to mitigate PDV is to use Time-Sensitive Networking, TSN, features, such as, e.g. packet pre-emption and scheduled traffic. This, however, adds a lot of support requirements from the network equipment, and will also increase the cost of the fronthaul network. It should also be noted that many TSN features require a high level of synchronization as a pre-condition.

Consequently, a major problem in fronthaul networks today is that a large part of the regular data traffic in packet-based fronthaul networks might carry radio content that has a very strict latency requirements. In this case, it might not be possible to pause and buffer frames, since this could violate the latency requirement and require that the packets are dropped. In this case, backpressure on the source might also not be feasible, since the "normal data traffic" is real-time data generated by the baseband processing function. Hence, there is a need to improve synchronization over a packet-based fronthaul network.

SUMMARY

It is an object of embodiments herein to improve synchronization over a packet-based fronthaul network.

According to a first aspect of embodiments herein, the object is achieved by a method performed by a network entity for synchronizing one or more first fronthaul network units with one or more second fronthaul network units across a packet-based fronthaul network carrying Time-Division Duplex, TDD, radio transmissions. The method comprises obtaining information indicating uplink, UL, and downlink, DL, time periods in the packet-based fronthaul network occupied by TDD radio transmissions transmitted and/or received by the one or more second fronthaul network units over its radio interface. The method further comprises scheduling packet-based synchronization messages between at least the one or more first fronthaul network units and the one or more second fronthaul network units over the packet-based fronthaul network based on the obtained information.

According to a second aspect of embodiments herein, the object is achieved by a network entity for synchronizing one or more first fronthaul network units with one or more second fronthaul network units across a packet-based fronthaul network carrying TDD radio transmissions. The network entity is configured to obtain information indicating UL and DL time periods in the packet-based fronthaul network occupied by TDD radio transmissions transmitted and/or received by the one or more second fronthaul network units over its radio interface. The network entity is also configured to schedule packet-based synchronization messages between at least the one or more first fronthaul network units and the one or more second fronthaul network units over the packet-based fronthaul network based on the obtained information.

According to a third aspect of the embodiments herein, a computer program is also provided configured to perform the method described above. Further, according to a fourth aspect of the embodiments herein, carriers are also provided configured to carry the computer program configured for performing the method described above.

By obtaining information indicating UL and DL time periods that are occupied by TDD radio transmissions transmitted or received over the radio interface of a fronthaul network unit, the network entity utilizes the realization that, when carrying radio content for TDD systems, packet-based fronthaul networks exhibits a similar periodic utilization pattern as that of the radio air interface. Hence, the network entity is able to schedule packet-based synchronization messages in the packet-based fronthaul network in such a way that Packed Delay Variation, PDV, in the packet-based fronthaul network is mitigated, i.e. by taking advantage of information about the radio TDD patterns. Hence, synchronization over the packet-based fronthaul network is improved.

BRIEF DESCRIPTION OF THE DRAWINGS

Features and advantages of the embodiments will become readily apparent to those skilled in the art by the following detailed description of exemplary embodiments thereof with reference to the accompanying drawings, wherein.

DETAILED DESCRIPTION

Figure 1:
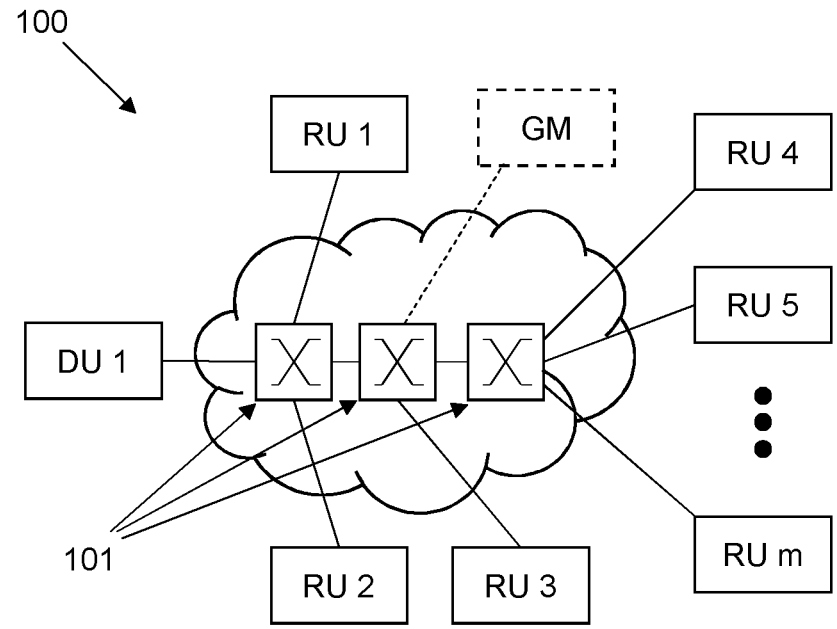
FIG. 1 is a schematic block diagram of a network architecture for a packet-based fronthaul network.

The figures are schematic and simplified for clarity, and they merely show details which are essential to the understanding of the embodiments presented herein, while other details have been left out. Throughout, the same reference numerals are used for identical or corresponding parts or steps.

Figure 2:
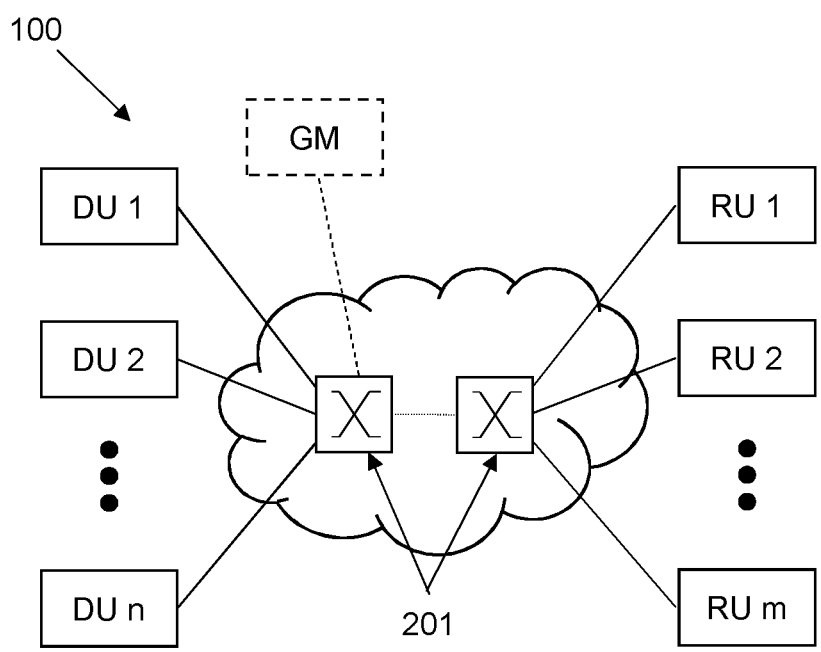
FIG. 2 is another schematic block diagram of a network architecture for a packet-based fronthaul network.

FIGS. 1-2 illustrates examples of simplified network architectures for a packet-based fronthaul network 100 in a Radio Access Network, RAN. The topology of the network architecture for the packet-based fronthaul network 100 in FIG. 1 may be referred to as a tree-like structure, while the topology of the network architecture for the packet-based fronthaul network 100 in FIG. 2 may be referred to as a dumbbell-like structure. The packet-based fronthaul network 100 in FIGS. 1-2 may be any packet-based fronthaul network capable of carrying Time-Division Duplex, TDD, radio transmissions, i.e. this means that the packet-based fronthaul network fulfils the delay requirements for serving certain Radio Access Technologies, RATs, configured with TDD radio transmissions. Also, the packet-based fronthaul network 100 in FIG. 1-2 may be implemented in a TDD-based RAN, such as, a NR or a LTE-TDD RAN, etc.

Further, the packet-based fronthaul network 100 in FIGS. 1-2 may comprise one or more baseband processing units, DU1, DU2, . . . , DUn. The baseband processing units DU1, DU2, . . . , DUn, may be connected to one or more remote radio units, RU1, RU2, . . . , RUm, via a number of intermediate fronthaul network switches 101, 201. Here, n and m is an integer depending on suitable deployment in the packet-based fronthaul network 100. The baseband processing units, DU1, DU2, . . . , DUn, the remote radio units, RU1, RU2, . . . , RUm, and the number of intermediate fronthaul network switches 101, 201 may be configured to communicate with each other over optical communications links in the packet-based fronthaul network 100.

Optionally, a grandmaster synchronization unit, GM, may also be connected to the packet-based fronthaul network 100 in FIGS. 1-2. The grandmaster synchronization unit, GM, may, for example, be a separate fronthaul network unit, one of the baseband processing unit, DU1, DU2, . . . , DUn or even one of the remote radio units, RU1, RU2, . . . , RUm, that has been elected, e.g. via a Best Master Clock Algorithm, BCMA, to be responsible for the timing exchange between the baseband processing units, DU1, DU2, . . . , DUn and the remote radio units, RU1, RU2, . . . , RUm. Furthermore, although only a few number of intermediate fronthaul network switches are shown in FIGS. 1-2, it should be noted that the number of intermediate fronthaul network switches 101, 201 in between the baseband processing units, DU1, DU2, . . . , DUn, and the remote radio units, RU1, RU2, . . . , RUm, may be significantly higher.

For the purpose of describing the advantages of the embodiments described herein, it should be noted that there are no direct communication links described between any of the one or more of the remote radio units, RU1, RU2, . . . , RUm, and their corresponding baseband processing unit, DU1, DU2, . . . , DUn. Conventionally, in such packet-based fronthaul networks, the intermediate fronthaul network switches 101, 201 will most prominently execute store-and-forward operations such that fronthaul data and control signalling, i.e. including synchronization messages, may traverse the packet-based fronthaul network 100. This means that a delay will be introduced in the packet-based fronthaul network 100 that is at least partly dependent on the number of hops between the baseband processing units, DU1, DU2, . . . , DUn, and the remote radio units, RU1, RU2, . . . , RUm. Further, it should also be noted that the use of multiple intermediate fronthaul network switches may be required in the packet-based fronthaul network 100, for example, in indoor deployments where the remote radio units RU1, RU2, . . . , RUm, are scattered in multiple floor levels. In addition, the intermediate fronthaul network switches 101, 201 may also comprise clocks or built-in uncertainties that may contribute to the overall delay experienced by a data packet, for example, a clock having a high frequency offsets or implementation specific indeterminacies in their switch fabric or forwarding engine, etc. This contribution to the overall delay, however, is normally relatively small in comparison.

However, a significant reason behind the overall delay or PDV in the packet-based fronthaul network 100 is that the synchronization messages in the packet-based fronthaul network 100 are competing for the same outbound link in each intermediate fronthaul network switch 101, 201 as the ordinary data generated by the baseband processing units, DU1, DU2, . . . , DUn in the DL direction and the remote radio units, RU1, RU2, . . . , RUm in the UL direction. Here, PDV may occur even if the synchronization messages have strictly higher priority than ordinary data packets, also referred to herein as fronthaul data or control packets. This is because, due to the store-and-forward operations implemented in the intermediate fronthaul network switch 101, 201, data packets that are already being transmitted on the outbound link are not considered when deciding which data packet should be transmitted next.

It may also be noted that even in case each of the remote radio units, RU1, RU2, . . . , RUm, and the baseband processing units, DU1, DU2, . . . , DUn, comprises GPS modules from which to extract accurate timing, there will always be some level of synchronization due to the TDD system under consideration; that is, different cells must e.g. at least respect their guard times so as to avoid inter-cell interference.

As part of the developing of the embodiments described herein, an important realization is that, when carrying radio content for TDD systems, a packet-based fronthaul networks exhibits a similar periodic utilization pattern as that of the radio or air interface. For example, in a DL direction, the traffic characteristics generated by multiple baseband processing units may be observed to have a periodicity similar to that of the following air radio interface of the remote network units. In other words, the DL traffic in the packet-5 based fronthaul network shows a TDD pattern where the links essentially are utilized in half-duplex mode even when signals are aggregated. Similar reasoning may also be applied to the UL direction from the remote network units. Thus, since modern 3GPP compliant communications systems, such as, NR and LTE, etc., most likely will be based on a TDD scheme for maximum performance, the dynamic TDD behaviour of the air radio interface will also likely be observed in the fronthaul network interfaces used to implement these systems.

Hence, some embodiments described herein exploits this dynamic TDD behaviour in the packet-based fronthaul network to send packet-based synchronization messages, e.g. PTP messages, in periods of low utilization in the packet-based fronthaul network. For example, by transmitting the packet-based synchronization messages in time periods opposing the active transmit direction of the air radio interface. This will significantly reduce or minimize PDV experienced by the packet-based synchronization messages. Additionally, some embodiments described herein may also exploit this fact to allow for longer transmit opportunities for transmitting packet-based synchronization messages in the packet-based fronthaul network in order to improve PDV and increase performance. This may be performed, for example, by restricting scheduling decisions, such as, e.g. slot formats and timing advance commands, in the fronthaul network.

In reference to the embodiments described hereinafter, the term "network entity" may refer to any one of the baseband processing units, DU1, DU2, . . . , DUn, the remote radio units, RU1, RU2, . . . , RUm, or the grandmaster synchronization unit, GM. Also, the term "fronthaul network unit" may refer to any one of the baseband processing units, DU1, DU2, . . . , DUn, or the remote radio units, RU1, RU2, . . . , RUm.

Figure 3:
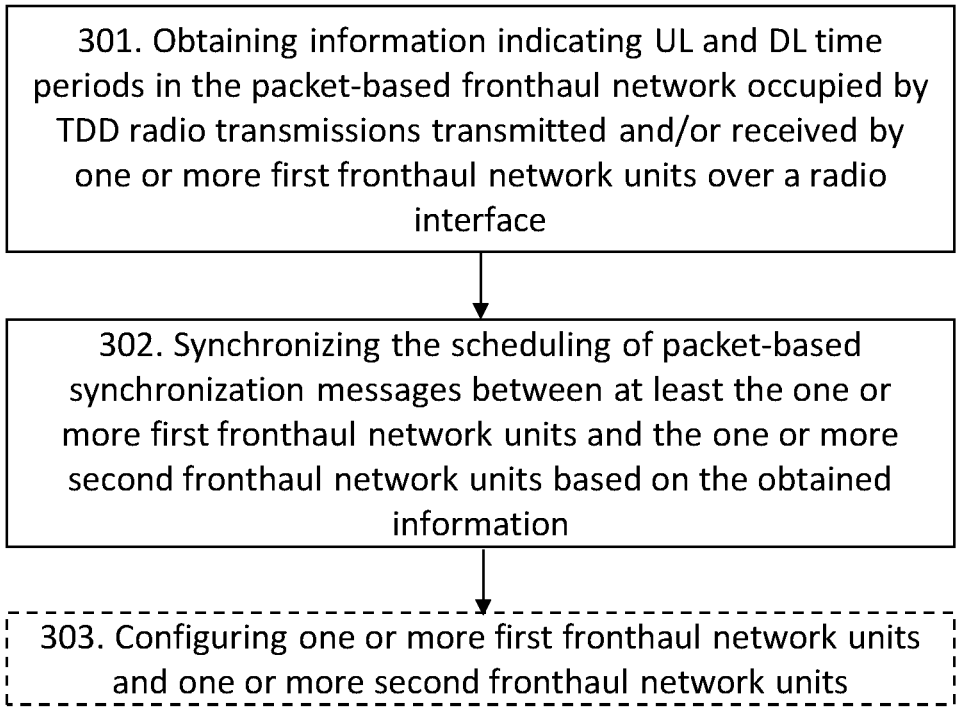
FIG. 3 is a flowchart depicting embodiments of a method in a network entity.

Examples of embodiments of a method performed by a network entity DU1, DU2, . . . , DUn; RU1, RU2, . . . , RUm, GM for synchronizing one or more first fronthaul network units RU1, RU2, . . . , RUm, DU1, DU2, . . . , DUn with one or more second fronthaul network units RU1, RU2, . . . , RUm, DU1, DU2, . . . , DUn across a packet-based fronthaul network 100 carrying Time-Division Duplex, TDD, radio transmissions, will now be described with reference to the flowchart depicted in FIG. 3. FIG. 3 is an illustrated example of actions or operations which may be taken by the network entity DU1, DU2, . . . , DUn; RU1, RU2, . . . , RUm, GM in the packet-based fronthaul network 100. The method may comprise the following actions.

Action 301

The network entity DU1, DU2, . . . , DUn; RU1, RU2, . . . , RUm, GM obtains information indicating uplink, UL, and downlink, DL, time periods in the packet-based fronthaul network 100 occupied by TDD radio transmissions transmitted and/or received by the one or more second fronthaul network units RU1, RU2, . . . , RUm, DU1, DU2, . . . , DUn over a radio interface. This means that information regarding the timing of communications in the packet-based fronthaul network 100 corresponding to the TDD behaviour of the radio communications over the radio interfaces of the fronthaul network units in the packet-based fronthaul network 100 is obtained.

According to some embodiments, the packet-based fronthaul network 100 may be full-duplex. This means that fronthaul data and control signalling, i.e. including packet-15 based synchronization messages, may be simultaneously transmitted in the UL and DL direction across the packet-based fronthaul network 100. Also, in some embodiments, the packet-based synchronization messages used in the packet-based fronthaul network 100 are timestamped data packets according to a packet-based synchronization protocol. For example, the packet-based synchronization messages may be synchronization messages as defined in the Precision Time Protocol, PTP, i.e. sync-, follow-up-, delay request- or delay response messages as described above.

Action 302

The network entity DU1, DU2, . . . , DUn; RU1, RU2, . . . , RUm, GM then schedules packet-based synchronization messages between at least the one or more first fronthaul network units RU1, RU2, . . . , RUm, DU1, DU2, . . . , DUn and the one or more second fronthaul network units RU1, RU2, . . . , RUm, DU1, DU2, . . . , DUn over the packet-based fronthaul network 100 based on the obtained information. This means that the obtained timing information regarding the communications in the packet-based fronthaul network 100 corresponding to the TDD behaviour of the radio communications over the radio interfaces of the fronthaul network units in the packet-based fronthaul network 100 is advantageously utilized when sending packet-based synchronization messages across the packet-based fronthaul network 100. For example, by transmitting the packet-based synchronization messages in time periods opposing the active transmit direction of the radio interface as described below. This will significantly reduce or minimize PDV experienced by the packet-based synchronization messages in the packet-based fronthaul network 100. In some embodiments, the network entity DU1, DU2, . . . , DUn; RU1, RU2, . . . , RUm, GM may schedule the packet-based synchronization messages in the UL and DL direction over the packet-based fronthaul network 100 during time periods not occupied by the UL or DL TDD radio transmissions.

Figure 4:
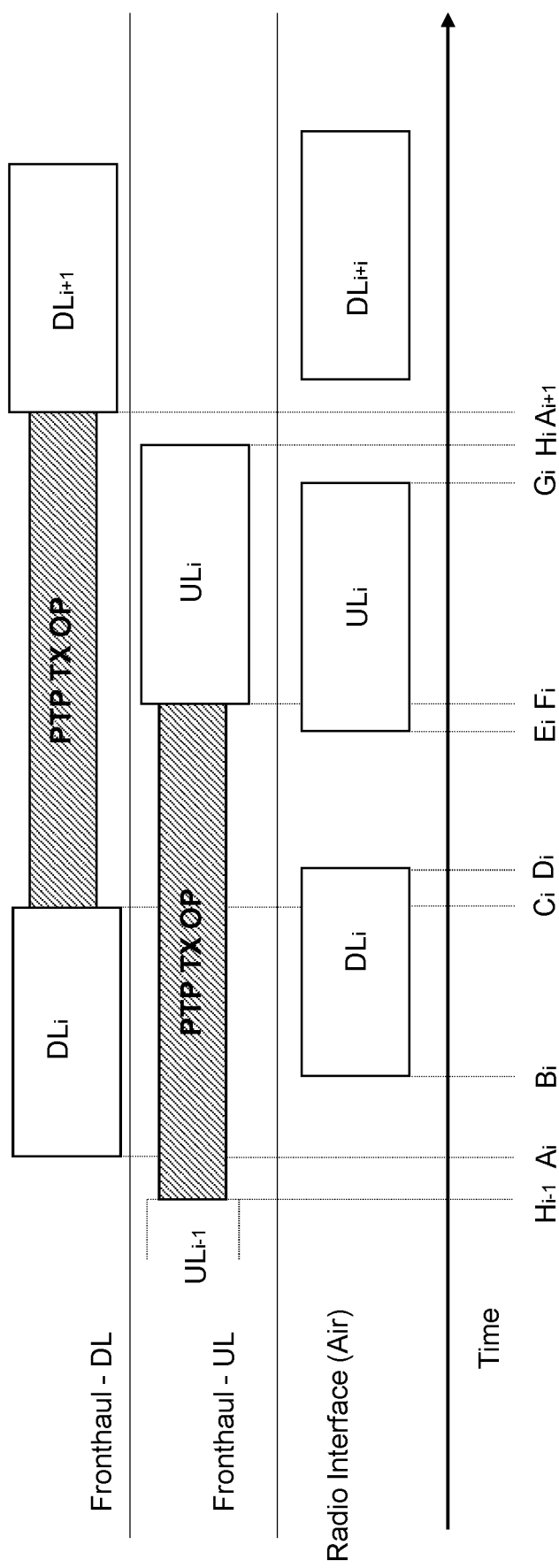
FIG. 4 is a schematic illustration of signalling according to embodiments of a network entity.

One example is described below with reference to the schematic illustration in FIG. 4 showing signalling and transmission opportunities for packet-based synchronization messages in the packet-based fronthaul network 100 according to some embodiments described herein. This example may be suitably implemented for a TDD system having with a fixed split ratio between UL and DL. This is, for example, the case when implemented in an LTE system, but may also cover NR system deployments where the TDD pattern is not changed over time. For the sake of simplicity and for illustrative purposes, the signalling the example in FIG. 4 is performed between a first fronthaul network unit, such as, a baseband processing unit DU1, and a second fronthaul network unit, such as, a remote radio unit RU1, over the packet-based fronthaul network 100. Here, it is also assumed that a master clock is situated at the baseband processing unit DU1 and that the remote radio unit RU1 comprises a slave clock. In the example in 4, the timing of signaling in both the UL and DL transmit directions is illustrated, but also the timing of the signalling on the radio interface.

First, a series of time instances are referenced in FIG. 4, wherein the subscript i is used to denote the i-th time instance:

Time instance A denotes the start of DL slot transmission on the fronthaul network interface of the baseband processing unit DU1;

Time instance B denotes the start of DL slot transmission on the remote radio unit's antenna, i.e. over the radio interface. This means that the time difference between time instance B and time instance A covers the time period that the data packets take to traverse the packet-based fronthaul network 100 plus the processing time at the remote radio unit RU1;

Time instance C denotes the end of the DL slot transmission on the fronthaul network interface of the baseband processing unit DU1. This means that the time difference between time instance C and time instance A covers the DL slot duration in the packet-based fronthaul network 100. This duration may differ compared with the DL slot duration over the radio interface because of, e.g. transmission of beamforming weights and other control information between the baseband processing unit DU1 and the remote radio unit RU1. The latter may occur when having certain functional splits between the baseband processing unit DU1 and the remote radio unit RU1;

Time instance D denotes the end of DL slot transmission on the remote radio unit's antenna, i.e. over the radio interface. This means that the time difference between time instance D and time instance B covers the duration of a DL slot on the radio interface. This duration may be influenced by the number of OFDM symbols that are active in a slot and is controlled by the scheduler. The maximum slot duration is defined by the numerology configuration;

Time instance E denoted the start of uplink reception at the remote radio unit's antenna, i.e. over the radio interface. This means that the time difference between time instance E and time instance D covers the guard period between DL and UL slots;

Time instance F denotes the start of UL slot transmission over the fronthaul network interface of the remote radio unit RU1. This means that the time difference between time instance F and time instance E covers the processing time of the remote radio unit RU1;

Time instance G denotes the end of UL slot reception at the remote radio unit's antenna, i.e. over the radio interface. The time instance G is influenced by the number of active OFDM symbols in an UL slot as controlled by the scheduler. The maximum slot duration is defined by the numerology configuration;

Time instance H denotes the end of UL slot transmission over the fronthaul network interface of the remote radio unit RU1. This means that the time difference between time instance H and time instance F covers the UL uplink slot duration in the packet-based fronthaul network 100. Also, this duration may differ compared with the UL slot duration over the radio interface because of, e.g. transmission of channel estimates and other control information between the baseband processing unit DU1 and the remote radio unit RU1. The latter may occur when having certain functional splits between the baseband processing unit DU1 and the remote radio unit RU1.

Secondly, the transmission opportunities in UL and DL for packet-based synchronization messages in the packet-based fronthaul network 100, according to some embodiments, is denoted by the dashed time periods, i.e. the PTP TX OP.

It follows that, according to some embodiments, at the end of a fronthaul transmission for DL slot i, denoted $C_i$ in FIG. 4, the baseband processing unit DU1 may instruct a PTP entity that it may start transmitting synchronization messages in the DL direction, i.e. from the baseband processing unit DU1 (master) to the remote radio unit RU1 (slave). The suitable transmission interval in this example extends until the time instance $A_{i+1}$, which signals the next activity interval for a DL slot on the fronthaul interface of the baseband processing unit DU1. In some embodiments, the communication between fronthaul network transmission logic and the PTP entity in the baseband processing unit DU1 may be realized, for example, by activating hardware interrupts.

When the TDD radio transmissions are part of an Long-Term Evolution, LTE, transmission, the one or more first fronthaul network units RU1, RU2, . . . , RUm, DU1, DU2, . . . , DUn and the one or more second fronthaul network units RU1, RU2, . . . , RUm, DU1, DU2, . . . , DUn may, according to some embodiments, be configured to not perform any assignments during the DwPTS in a special subframe. The network entity DU1, DU2, . . . , DUn; RU1, RU2, . . . , RUm, GM may then schedule the packet-based synchronization messages further based on this configuration. In the example of FIG. 4, this means that the baseband processing unit DU1 may increase the interval available for PTP exchanges, by not distributing assignments during the DwPTS part of the transition subframe. This action moves the time instant $C_i$ to an earlier time, thus increasing the time period between time instance $C_i$ to time instance $A_{i+1}$. Alternatively, when the TDD radio transmissions are part of an Long-Term Evolution, LTE, transmission, the one or more first fronthaul network units RU1, RU2, . . . , RUm, DU1, DU2, . . . , DUn and the one or more second fronthaul network units RU1, RU2, . . . , RUm, DU1, DU2, . . . , DUn may, according to some embodiments, be configured with a special subframe having fewer DwPTS symbols than a currently configured special subframe. The network entity DU1, DU2, . . . , DUn; RU1, RU2, . . . , RUm, GM may then schedule the packet-based synchronization messages further based on this configuration. In the example of FIG. 4, this means that the baseband processing unit DU1 may increase the interval available for PTP exchanges by configuring the special subframe, e.g. a downlink-to-uplink switch subframe, to an option with fewer DwPTS symbols. This action moves the time instant $C_i$ to an earlier time, thus increasing the time period between time instance $C_i$ to time instance $A_{i+1}$. In some embodiments, the PTP entity in the baseband processing unit DU1 may pace the data packets in such a way that there is a silent time interval between the last fronthaul data or control packet and the departure of the PTP message to be transmitted. This interval is responsible for allowing the queues between baseband processing unit DU1 and the remote radio unit RU1 to be "flushed" and lowering the probability that one-way delay is influenced by switch store-and-forward variable delays.

According to some embodiments, at the end of a fronthaul transmission for UL slot i-1, denoted $H_{i+1}$ in FIG. 4, the remote radio unit RU1 may instruct a PTP entity that it may start transmitting synchronization messages in the UL direction, i.e. from the remote radio unit RU1 (slave) to the baseband processing unit DU1 (master). The suitable transmission interval in this example extends until the time instance $F_i$, which signals the next activity interval for a UL slot on the fronthaul interface of the remote radio unit RU1. In some embodiments, the communication between fronthaul network transmission logic and the PTP entity in the remote radio unit RU1 may be realized, for example, by activating hardware interrupts.

When the TDD radio transmissions are part of an Long-Term Evolution, LTE, transmission, the one or more first fronthaul network units RU1, RU2, . . . , RUm, DU1, DU2, . . . , DUn and the one or more second fronthaul network units RU1, RU2, . . . , RUm, DU1, DU2, . . . , DUn may, according to some embodiments, be configured to not perform any transmissions during the UpPTS part in a special subframe. The network entity DU1, DU2, . . . , DUn; RU1, RU2, . . . , RUm, GM may then schedule the packet-based synchronization messages further based on this configuration. In the example of FIG. 4, this means that the baseband processing unit DU1 may increase the interval available for PTP exchanges, by leaving the UpPTS part of the transition subframe silent, i.e. not requesting channel sounding measurements. This action moves the time instant $F_i$ to a later time, thus increasing the time period between time instance $H_{i+1}$ to time instance $F_i$. Alternatively, when the TDD radio transmissions are part of an Long-Term Evolution, LTE, transmission, the one or more first fronthaul network units RU1, RU2, . . . , RUm, DU1, DU2, . . . , DUn and the one or more second fronthaul network units RU1, RU2, . . . , RUm, DU1, DU2, . . . , DUn may, according to some embodiments, be configured with a special subframe having fewer UpPTS symbols than a currently configured special subframe. The network entity DU1, DU2, . . . , DUn; RU1, RU2, . . . , RUm, GM may then schedule the packet-based synchronization messages further based on this configuration. In the example of FIG. 4, this means that the baseband processing unit DU1 may increase the interval available for PTP exchanges by configuring the special subframe, e.g. a downlink-to-uplink switch subframe, to an option with fewer UpPTS symbols. This action moves the time instant $F_i$ to a later time, thus increasing the time period between time instance $H_{i-1}$ to time instance $F_i$. According to some embodiments, it may in some situations be advantageous to increase the time period between time instance $C_i$ to time instance $F_i$. This may be achieved by issuing timing advance commands that increase $F_i$. For example, in LTE, if all symbols are transmitted, this would decrease the time period between time instance $H_i$ to time instance $A_{i+1}$. In some embodiments, the PTP entity in the remote radio unit RU1 may pace the data packets in such a way that there is a silent time interval between the last fronthaul data or control packet and the departure of the PTP message to be transmitted. This interval is responsible for allowing the queues between the remote radio unit RU1 and the baseband processing unit DU1 to be "flushed" and lowering the probability that one-way delay is influenced by switch store-and-forward variable delays.

In some embodiments, the network entity DU1, DU2, . . . , DUn; RU1, RU2, . . . , RUm, GM may further schedule of DL packet synchronization messages in the DL direction over the packet-based fronthaul network 100 during time periods that are not occupied by DL TDD radio transmissions, and the scheduling of UL packet synchronization messages is performed in the UL direction over the packet-based fronthaul network 100 during time periods that are not occupied by UL or DL TDD radio transmissions. This may be a particularly advantageous combination since the whole PTP round-trip transmission of synchronization messages may be comprised in time periods of low activity in the packet-based fronthaul network 100.

Figure 5:
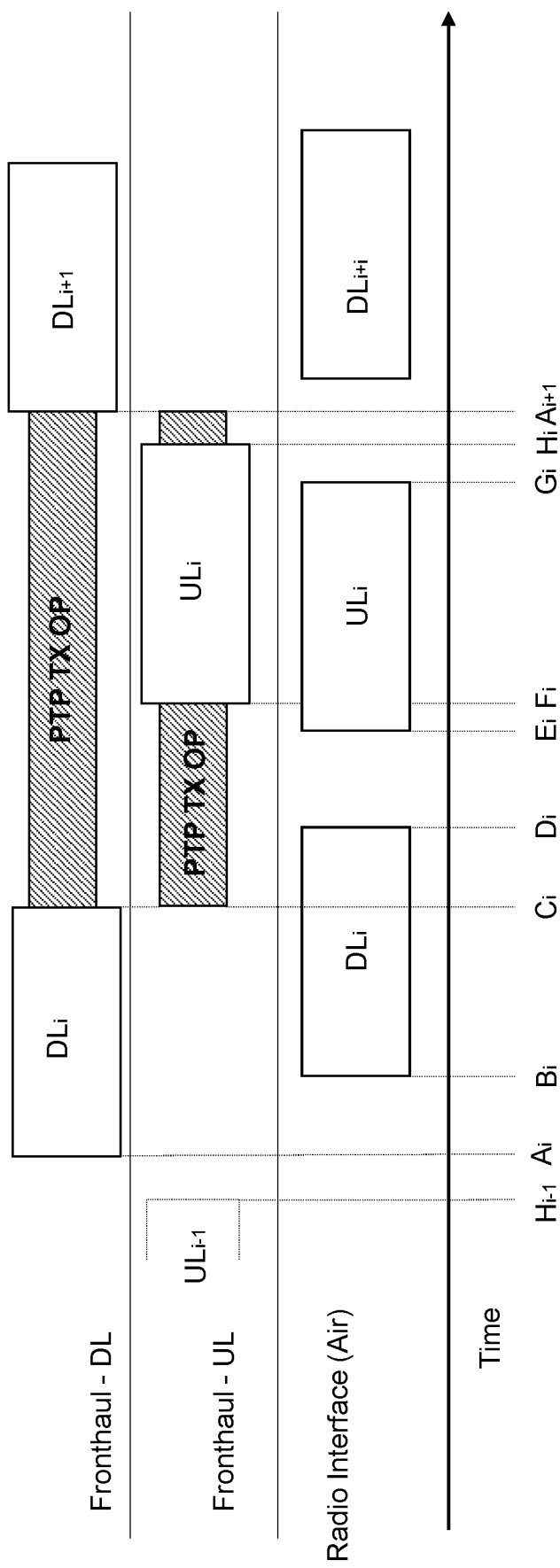
FIG. 5 is another schematic illustration of signalling according to embodiments of a network entity.

This is described in another example with reference to the schematic illustration in FIG. 5 showing signalling and transmission opportunities for packet-based synchronization messages in the packet-based fronthaul network 100 according to some embodiments described herein. Here, an example of PTP message scheduling where the round-trip messages are confined in time periods of inactivity in the packet-based fronthaul network 100. For example, sync- and follow-up-messages from the baseband processing unit DU1 (master) to the remote radio unit RU1 (slave) may be sent in the time period between time instance $C_i$ to time instance $A_{i+1}$, while delay request- and delay response-messages may be scheduled in the time period between time instance $C_i$ to time instance $F_i$, and the time period between time instance $H_i$ to time instance $A_{i+1}$. Here, it should be noted that the follow-up- and delay response-messages are not time-critical synchronization messages, so there is less of a need for transmitting these in only during the dashed marked time periods in FIGS. 4-5. However, in general, these synchronization messages are normally transmitted close to their respective time-critical counterpart, i.e. the delay request- and sync-message, respectively.

Figure 6:
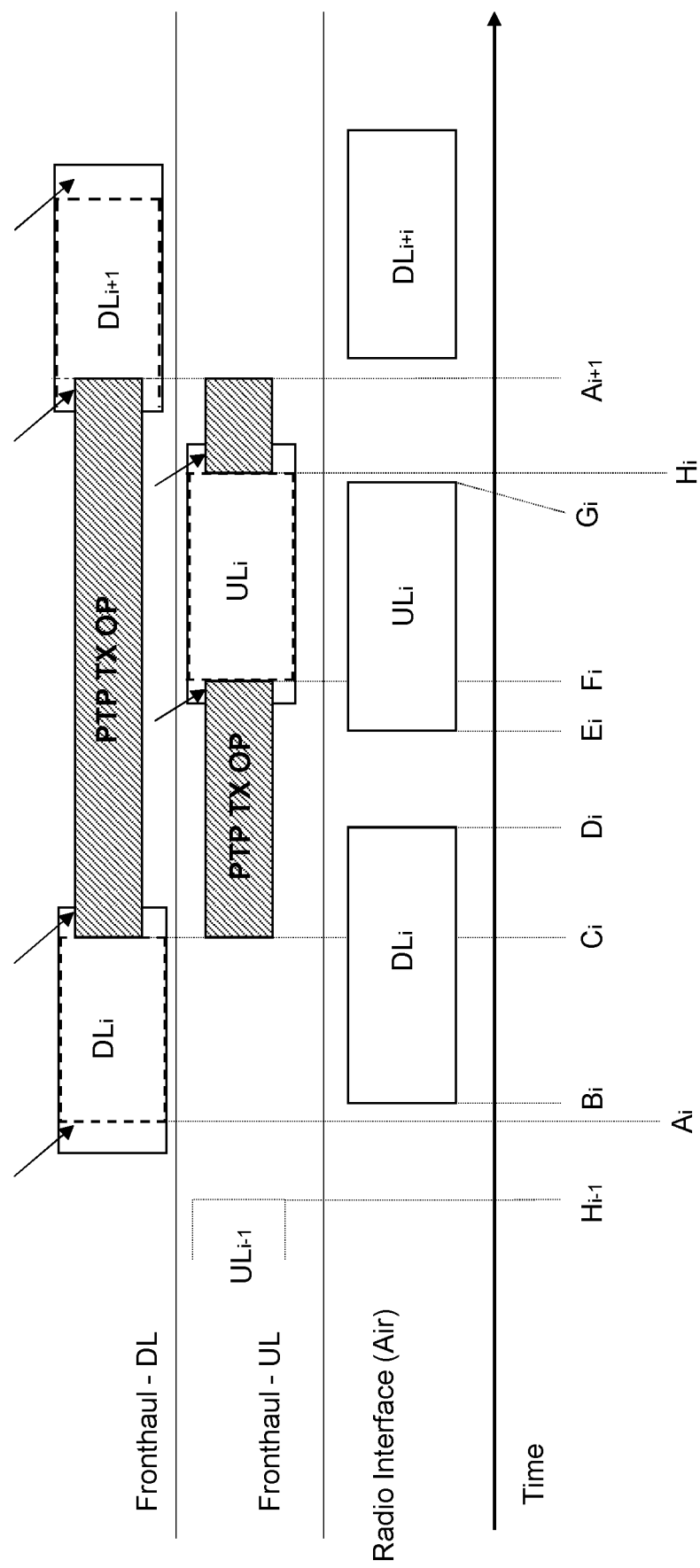
FIG. 6 is yet another schematic illustration of signalling according to embodiments of a network entity.
Figure 7:
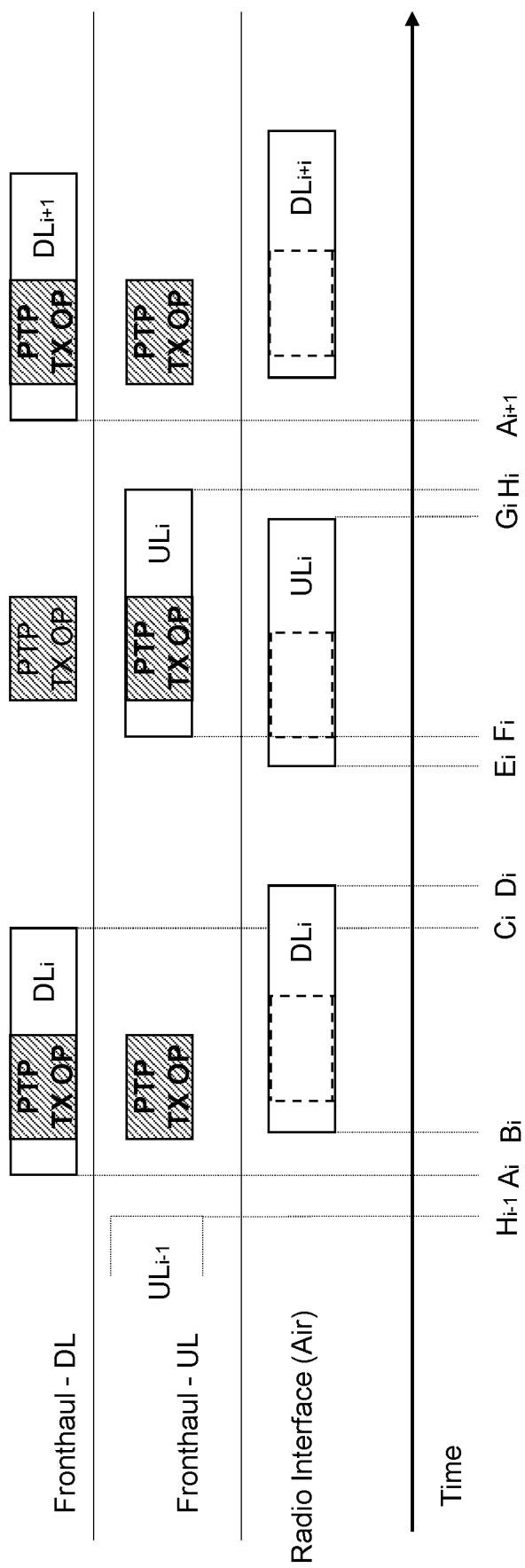
FIG. 7 is a further schematic illustration of signalling according to embodiments of a network entity.

Further examples are described below with reference to the schematic illustrations in FIG. 6-7 showing signalling and transmission opportunities for packet-based synchronization messages in the packet-based fronthaul network 100 according to some embodiments described herein. These examples may be suitably implemented for a TDD system having a configurable TDD split ratio, that is, when having a configurable TDD split ratio between the UL and DL time periods that are occupied by TDD radio transmissions.

For example, in NR, the split between DL and UL slots over the radio interface is normally controlled by the scheduler and signalled to wireless devices in the RAN via control signalling, such as, Downlink Control Information, DCI, or Slot-format Indicator, SFI, etc., or by using Radio Resource Control, RRC messages. This gives very flexible control to specify the DL or UL for heavy traffic periods, but also to allows for controlling the guard period between DL and UL by using so-called "flexible" symbols. The TDD split may be fully dynamic with the scheduler controlling transmit direction via scheduling grants. Alternatively, the TDD split may be semi-statically defined using RRC messages. A third option may be a TDD split that combines a RRC semi-static signalling with a dynamic slot format indication. For RAN cells using a semi-static RRC configuration, the control over the TDD slot format is exercised by selecting a pattern or set of patterns for OFDM symbol utilization, wherein the pattern comprise either UL, DL and "flexible" OFDM symbols. One example of a sequence may be DL, DL, DL, . . . , DL, F, F, UL, . . . , UL, UL, where a sequence of downlink symbols is followed by two flexible symbols and the remaining symbols are distributed to uplink. The flexible time slots may be monitored by the wireless device in the RAN, but are not used for UL transmission unless explicitly notified.

Similarly as for FIGS. 5-6, for the sake of simplicity and for illustrative purposes, the signalling in the examples shown in FIG. 6-7 is performed between a first fronthaul network unit, such as, a baseband processing unit DU1, and a second fronthaul network unit, such as, a remote radio unit RU1, over the packet-based fronthaul network 100. Here, it is also assumed that a master clock is situated at the baseband processing unit DU1 and that the remote radio unit RU1 comprises a slave clock. In the example in FIG. 6, the timing of signaling in both the UL and DL transmit directions is illustrated, but also the timing of the signalling on the radio interface.

Prior to controlling the TDD split ratio in accordance with some embodiments, the baseband processing unit DU1 may, at initialization or triggered by a configuration change, determine a required PTP message rate subjected to the limits given by an adopted PTP profile. Based on the required message rate and knowledge of fronthaul network interface parameters, such as, e.g. bitrate, the baseband processing unit DU1 may determine the necessary timing intervals for PTP message transmissions. After this is performed, the baseband processing unit DU1 may control the TDD split ratio such the necessary timing intervals are met, which will lead to a PTP message exchange with low Packet Delay Variation, PDV, across the packet-based fronthaul network 100.

According to some embodiments, in case the one or more first fronthaul network units RU1, RU2, . . . , RUm, DU1, DU2, . . . , DUn and the one or more second fronthaul network units RU1, RU2, . . . , RUm, DU1, DU2, . . . , DUn are configured with a TDD split ratio between UL and DL time periods such that one or more guards periods between the UL and DL time periods comprise one or more OFDM symbol, and configured to not transmit in the n first and/or m last OFDM symbols of the one or more guard periods, the network entity DU1, DU2, . . . , DUn; RU1, RU2, . . . , RUm, GM may schedule the packet-based synchronization messages further based on this configuration. An example of this is depicted in FIG. 6. Here, the transmission in the first and last OFDM symbols in each direction is restricted to increase the available time for PTP message transmission. The new possible time periods are indicated by the arrows in FIG. 6. In FIG. 6, the PTP transmit opportunities, PTP TX OP, are improved with the aid of TDD split ratio control as indicated by the arrows. The scheduler may here increase the time periods dedicated to PTP transmission, such as, the time period between time instance $C_i$ to time instance $F_i$, the time period between time instance $H_i$ to time instance $A_{i+1}$, and the time period between time instance $C_i$ to time instance $A_{i+1}$, by making the first and last symbols in each direction silent. Examples of such extended time periods are indicated by the dashed boxes in FIG. 6.

Also, according to some embodiments, the network entity DU1, DU2, . . . , DUn; RU1, RU2, . . . , RUm, GM may also use timing advance commands to extend the guard periods by at least a part of an OFDM symbol. For the example in FIG. 6, this means that the time period between time instance $C_i$ to time instance $F_i$ may be further expanded by the baseband processing unit DU1 through the issuance of timing advance commands. This is especially useful in small cells, such as, e.g. for indoor environment deployments, and may be used in combination with restricting transmissions in the last OFDM symbol(s) in a time slot.

According to some embodiments, in case the one or more first fronthaul network units RU1, RU2, . . . , RUm, DU1, DU2, . . . , DUn and the one or more second fronthaul network units RU1, RU2, . . . , RUm, DU1, DU2, . . . , DUn are configured with a TDD split ratio between UL and DL time periods wherein the UL and DL time periods comprise one or more OFDM symbols that are restricted from transmissions, the network entity DU1, DU2, . . . , DUn; RU1, RU2, . . . , RUm, GM may schedule the packet-based synchronization messages further based on this configuration. An example of this is depicted in FIG. 7. Here, transmissions in symbols during downlink and uplink symbol sequences are restricted, which will create a periodic transmission opportunity for PTP exchanges with low PDV. Contrary to the example shown in FIG. 6, the restricted symbols are here not at the edge of the transmission. In FIG. 7, the PTP transmit opportunities, PTP TX OP, are improved with the aid of TDD split ratio control. In this example, the transmit opportunities may be generated by restricting the use of symbols during a downlink or uplink sequence of symbols, which not necessarily needs to be the ones at the edge of a transmission.

For the examples shown in FIGS. 6-7, as for the earlier examples in FIG. 4-5, it should also be noted that the baseband processing unit DU1 may, in some embodiments, notify its PTP entity about the suitable transmit opportunities as described above for messages in the DL direction, i.e. from the baseband processing unit DU1 (master) to the remote radio unit RU1 (slave). This communication may be executed using for example, hardware interrupts. Also, in these examples and according to some embodiments, the PTP entity in the baseband processing unit DU1 may pace the data packets in such a way that there is a silent time interval between the last fronthaul data or control packet and the departure of the PTP message to be transmitted. This interval is responsible for allowing the queues between the baseband processing unit DU1 and the remote radio unit RU1 to be "flushed" and lowering the probability that one-way delay is influenced by switch store-and-forward variable delays. Further, according to some embodiments, the baseband processing unit DU1 may, in some embodiments, notify the remote radio unit RU1 (slave) and its PTP entity about suitable transmit opportunities as described above. Hence, The PTP entity at the remote radio unit RU1 may use this information to suitably pace the PTP message transmission in the UL direction, i.e. from the remote radio unit RU1 (slave) to the baseband processing unit DU1 (master).

Figure 8:
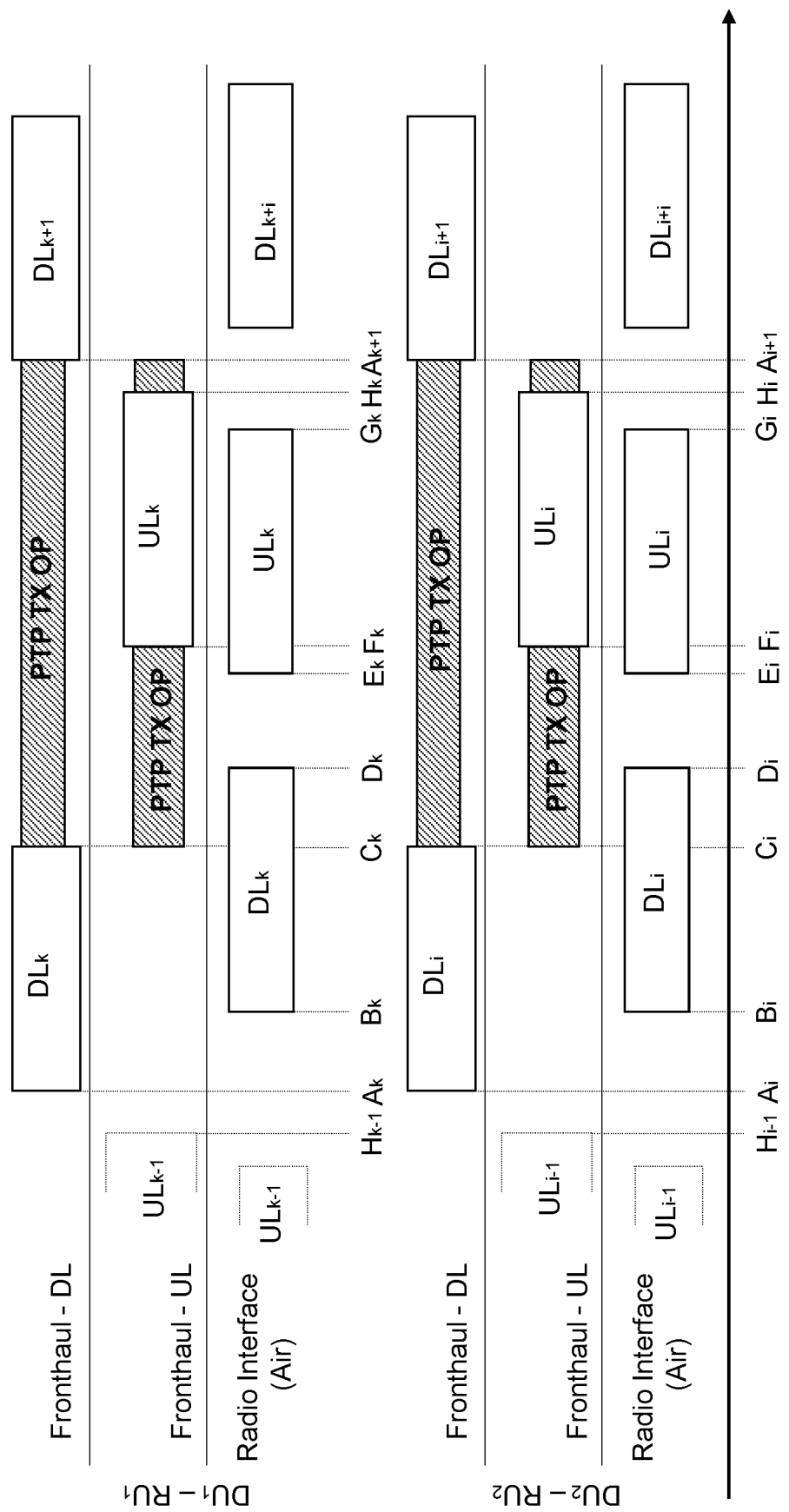
FIG. 8 is yet a further schematic illustration of signalling according to embodiments of a network entity.

Yet a further example is described below with reference to the schematic illustration in FIG. 8 showing signalling and transmission opportunities for packet-based synchronization messages in the packet-based fronthaul network 100 according to some embodiments described herein. FIG. 8 shows a scenario comprising multiple baseband processing unit-remote radio unit, DU-RU, pairs. The embodiments described above may be used to generate transmission opportunities packet-based synchronization messages for each DU-RU pair in the packet-based fronthaul network 100, wherein the alignment is given by the TDD requirements over the radio interfaces.

This example demonstrate the advantage of implementing the embodiments described herein in Radio Dot System (RDS) deployments comprising at least one fronthaul network switch. In this case, the network topology may be tree-shaped as shown in FIG. 1. It should be noted that for RDS deployments, an elected grandmaster synchronization unit, GM, as shown in FIGS. 1-2, is typically located in an indoor radio unit and each radio dot comprise a slave clock. Here, the at least one fronthaul network switch may extend the reach of the Ethernet-base T transceivers and helps with the fan-out of cables. In order to enable more advanced features, such as, e.g. indoor positioning via OTDOA, the TAE must be extremely small.

The embodiments described herein and exemplified in the examples shown in FIGS. 5-8 may be used in order to improve the TAE in this type of system. Since this type of deployment is isolated, i.e. only comprises fronthaul traffic, the GM may fully control the departure of PTP messages, and the radio dot may be configured to utilize the PTP transmit opportunities in the UL in such a manner that no collisions will occur. In topologies with multiple pairings of baseband and radio nodes, such as the dumbbell in FIG. 1, the grand master clock, present in one of the DUs must exchange PTP messages with all other PTP clocks.

As mentioned previously, a BMCA algorithm can be used to choose a grandmaster synchronization unit, GM, such that, for example, a single baseband processing unit D1 may exchange packet-based synchronization messages with all remote radio units RU1, RU2, . . . , RUm. Furthermore, especially in the case where all baseband processing units D1, DU2, . . . , DUn, comprise GPS modules for timing acquisition, a grandmaster synchronization unit, GM, may control the departures of the packet-based synchronization messages as indicated in the above described embodiments, while at the same time take advantage of existing TDD requirement synchronization between the baseband processing units D1, DU2, . . . , DUn. This existing TDD requirement synchronization will ensure that the time slots has been suitably configured such that the transmit opportunities for the packet-based synchronization messages according to the embodiments described herein are aligned. Here, it should be noted that as long as the transmit opportunities for the packet-based synchronization messages exist and are aligned, the GM may have full control of departures of the packet-based synchronization messages and may achieve the advantages provided by the embodiments described herein. Furthermore, in the UL direction, the transmit opportunities for the packet-based synchronization messages may be multiplexed in time in such a way that, for example, a single PTP entity at a time may exchange delay request messages with the GM. The order in which these transactions occur may be configured, for example, by using control messages.

Action 303

Optionally, the network entity DU1, DU2, . . . , DUn; RU1, RU2, . . . , RUm, GM may also configure the one or more first fronthaul network units RU1, RU2, . . . , RUm, DU1, DU2, . . . , DUn and the one or more second fronthaul network units RU1, RU2, . . . , RUm, DU1, DU2, . . . , DUn. This means, for example, that a network entity, such as, e.g. an elected grandmaster synchronization unit, GM, may configure the baseband processing units, DU1, DU2, . . . , DUn, and the remote radio units, RU1, RU2, . . . , RUm, to perform the scheduling of the packet-based synchronization messages described in Action 302 in order to synchronize the baseband processing units, DU1, DU2, . . . , DUn, and the remote radio units, RU1, RU2, . . . , RUm, with each other. This means that, in some embodiments, the network entity DU1, DU2, . . . , DUn; RU1, RU2, . . . , RUm, GM may transmit configuration information to the one or more first fronthaul network units RU1, RU2, . . . , RUm, DU1, DU2, . . . , DUn and/or the one or more second fronthaul network units RU1, RU2, . . . , RUm, DU1, DU2, . . . , DUn.

In some embodiments, in case the TDD radio transmissions are part of an Long-Term Evolution, LTE, transmission, the network entity DU1, DU2, . . . , DUn; RU1, RU2, . . . , RUm, GM may configure the one or more first fronthaul network units RU1, RU2, . . . , RUm, DU1, DU2, . . . , DUn and the one or more second fronthaul network units RU1, RU2, . . . , RUm, DU1, DU2, . . . , DUn to not perform any assignments during the DwPTS part and/or transmissions during the UpPTS part in a special subframe. Optionally, in some embodiments, in case the TDD radio transmissions are part of an Long-Term Evolution, LTE, transmission, the network entity DU1, DU2, . . . , DUn; RU1, RU2, . . . , RUm, GM may configure the one or more first fronthaul network units RU1, RU2, . . . , RUm, DU1, DU2, . . . , DUn and the one or more second fronthaul network units RU1, RU2, . . . , RUm, DU1, DU2, . . . , DUn with a special subframe having fewer DwPTS symbols and/or UpPTS symbols than a currently configured special subframe.

In some embodiments, in case of having a configurable TDD split ratio between the UL and DL time periods that are occupied by TDD radio transmissions, the network entity DU1, DU2, . . . , DUn; RU1, RU2, . . . , RUm, GM may configure the one or more first fronthaul network units RU1, RU2, . . . , RUm, DU1, DU2, . . . , DUn and the one or more second fronthaul network units RU1, RU2, . . . , RUm, DU1, DU2, . . . , DUn with a TDD split ratio between UL and DL time periods such that one or more guards periods between the UL and DL time periods comprise one or more OFDM symbol, and to not transmit in the n first and/or m last OFDM symbols of the one or more guard periods. In this case, according to some embodiments, the network entity DU1, DU2, . . . , DUn; RU1, RU2, . . . , RUm, GM may use timing advance commands to extend the guard periods by at least a part of an OFDM symbol. Optionally, in some embodiments, in case of having a configurable TDD split ratio between the UL and DL time periods that are occupied by TDD radio transmissions, the network entity DU1, DU2, . . . , DUn; RU1, RU2, . . . , RUm, GM may configure the one or more first fronthaul network units RU1, RU2, . . . , RUm, DU1, DU2, . . . , DUn and the one or more second fronthaul network units RU1, RU2, . . . , RUm, DU1, DU2, . . . , DUn with a TDD split ratio between UL and DL time periods wherein the UL and DL time periods comprise one or more OFDM symbols that are restricted from transmissions.

Figure 9:
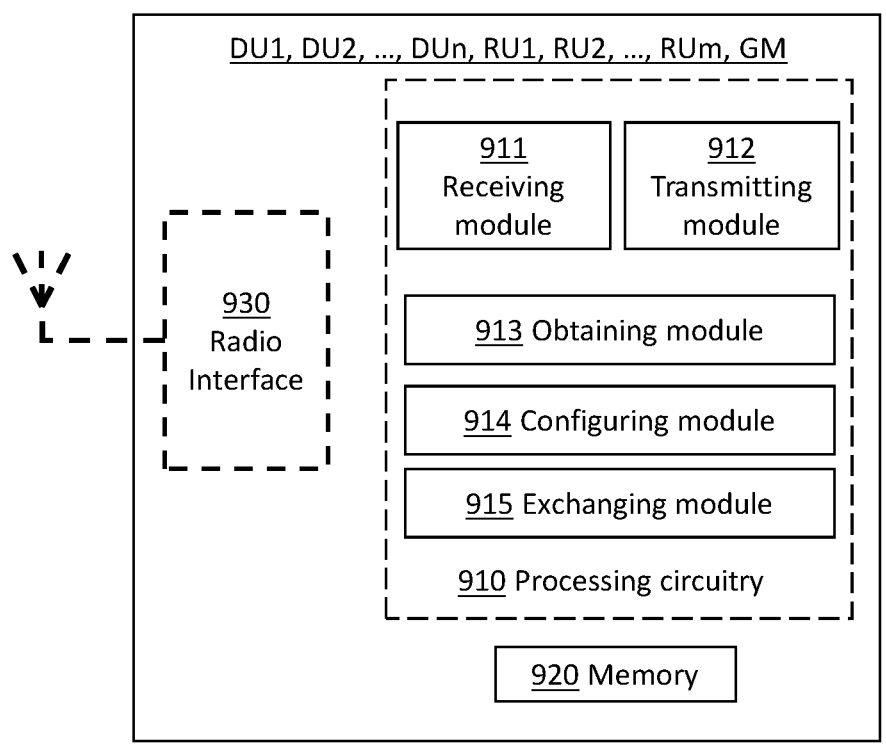
FIG. 9 is a block diagram depicting embodiments of a network entity.

To perform the method actions in a network entity DU1, DU2, . . . , DUn, RU1, RU2, . . . , RUm, GM, for synchronizing one or more first fronthaul network units RU1, RU2, . . . , RUm, DU1, DU2, . . . , DUn with one or more second fronthaul network units RU1, RU2, . . . , RUm, DU1, DU2, . . . , DUn across a packet-based fronthaul network 100 carrying Time-Division Duplex, TDD, radio transmissions, the network entity DU1, DU2, . . . , DUn, RU1, RU2, . . . , RUm, GM, may comprise the following arrangement depicted in FIG. 9. FIG. 9 shows a schematic block diagram of embodiments of a network entity DU1, DU2, . . . , DUn, RU1, RU2, . . . , RUm, GM. The embodiments of the network entity DU1, DU2, . . . , DUn, RU1, RU2, . . . , RUm, GM, described herein may be considered as independent embodiments or may be considered in any combination with each other to describe non-limiting examples of the example embodiments described herein.

The network entity DU1, DU2, . . . , DUn, RU1, RU2, . . . , RUm, GM, may comprise processing circuitry 910 and a memory 920. The processing circuitry 910 may also comprise a receiving module 911 and a transmitting module 912. The receiving module 911 and the transmitting module 912 may also be configured to communicate and perform transmissions over the packet-based fronthaul network 100, for example, transmit and receive payload data for TDD radio transmissions and synchronization messages. Optionally, in case the network entity DU1, DU2, . . . , DUn, RU1, RU2, . . . , RUm, GM, is a remote radio unit RU1, RU2, . . . , RUm, the receiving module 1111 and the transmitting module 1112 may comprise Radio Frequency, RF, processing circuitry capable of transmitting a radio signal via a radio interface 1130. The receiving module 1111 and the transmitting module 1112 may also form part of a single transceiver. It should also be noted that some or all of the functionality described in the embodiments above as being performed by the network entity DU1, DU2, . . . , DUn, RU1, RU2, . . . , RUm, GM, may be provided by the processing circuitry 910 executing instructions stored on a computer-readable medium, such as, e.g. the memory 920 shown in FIG. 9. Alternative embodiments of the network entity DU1, DU2, . . . , DUn, RU1, RU2, . . . , RUm, GM, may comprise additional components, such as, for example, an obtaining module 913, a configuring module 914, and a scheduling module 915, each responsible for providing its respective functionality necessary to support the embodiments described herein.

The network entity DU1, DU2, . . . , DUn, RU1, RU2, . . . , RUm, GM, or processing circuitry 910 is configured to, or may comprise the obtaining module 913 configured to, obtain information indicating UL and DL time periods in the packet-based fronthaul network 100 occupied by TDD radio transmissions transmitted and/or received by the one or more second fronthaul network units RU1, RU2, . . . , RUm, DU1, DU2, . . . , DUn over its radio interface. Also, network entity DU1, DU2, . . . , DUn, RU1, RU2, . . . , RUm, GM, or processing circuitry 910 is configured to, or may comprise the scheduling module 915 configured to, schedule packet-based synchronization messages between at least the one or more first fronthaul network units RU1, RU2, . . . , RUm, DU1, DU2, . . . , DUn and the one or more second fronthaul network units RU1, RU2, . . . , RUm, DU1, DU2, . . . , DUn over the packet-based fronthaul network 100 based on the obtained information.

In some embodiments, the network entity DU1, DU2, . . . , DUn, RU1, RU2, . . . , RUm, GM, or processing circuitry 910 may be configured to, or may comprise the scheduling module 915 configured to, perform the scheduling of the packet-based synchronization messages in the UL and DL direction over the packet-based fronthaul network 100 during time periods not occupied by the UL/DL TDD radio transmissions. In some embodiments, the network entity DU1, DU2, . . . , DUn, RU1, RU2, . . . , RUm, GM, or processing circuitry 910 may be configured to, or may comprise the scheduling module 915 configured to, perform the scheduling of DL packet synchronization messages in the DL direction over the packet-based fronthaul network 100 during time periods that are not occupied by DL TDD radio transmissions, and the scheduling of packet-based synchronization messages in the UL direction over the packet-based fronthaul network 100 during time periods that are not occupied by UL or DL TDD radio transmissions.

In some embodiments, in case the TDD radio transmissions are part of an Long-Term Evolution, LTE, transmission, the network entity DU1, DU2, . . . , DUn, RU1, RU2, . . . , RUm, GM, or processing circuitry 910 may be configured to, or may comprise the configuring module 914 configured to, configure the one or more first fronthaul network units RU1, RU2, . . . , RUm, DU1, DU2, . . . , DUn and the one or more second fronthaul network units RU1, RU2, . . . , RUm, DU1, DU2, . . . , DUn, to not perform any assignments during the DwPTS part and/or transmissions during the UpPTS part in a special subframe. Here, the network entity DU1, DU2, . . . , DUn, RU1, RU2, . . . , RUm, GM, or processing circuitry 910 may also be configured to, or may comprise the scheduling module 915 configured to, perform the scheduling of the packet-based synchronization messages further based on this configuration of the one or more first fronthaul network units RU1, RU2, . . . , RUm, DU1, DU2, . . . , DUn and the one or more second fronthaul network units RU1, RU2, . . . , RUm, DU1, DU2, . . . , DUn Optionally, in some embodiments, in case the TDD radio transmissions are part of an Long-Term Evolution, LTE, transmission, the network entity DU1, DU2, . . . , DUn, RU1, RU2, . . . , RUm, GM, or processing circuitry 910 may be configured to, or may comprise the configuring module 914 configured to, configure the one or more first fronthaul network units RU1, RU2, . . . , RUm, DU1, DU2, . . . , DUn and the one or more second fronthaul network units RU1, RU2, . . . , RUm, DU1, DU2, . . . , DUn with a special subframe having fewer DwPTS symbols and/or UpPTS symbols than a currently configured special subframe. Here, the network entity DU1, DU2, . . . , DUn, RU1, RU2, . . . , RUm, GM, or processing circuitry 910 may also be configured to, or may comprise the scheduling module 915 configured to, perform the scheduling of the packet-based synchronization messages further based on this configuration of the one or more first fronthaul network units RU1, RU2, . . . , RUm, DU1, DU2, . . . , DUn and the one or more second fronthaul network units RU1, RU2, . . . , RUm, DU1, DU2, . . . , DUn.

According to another option, in some embodiments, in case of having a configurable TDD split ratio between the UL and DL time periods that are occupied by TDD radio transmissions, the network entity DU1, DU2, . . . , DUn, RU1, RU2, . . . , RUm, GM, or processing circuitry 910 may be configured to, or may comprise the configuring module 914 configured to, configure the one or more first fronthaul network units RU1, RU2, . . . , RUm, DU1, DU2, . . . , DUn and the one or more second fronthaul network units RU1, RU2, . . . , RUm, DU1, DU2, . . . , DUn with a TDD split ratio between UL and DL time periods such that one or more guards periods between the UL and DL time periods comprise one or more OFDM symbol, and to not transmit in the n first and/or m last OFDM symbols of the one or more guard periods. Here, the network entity DU1, DU2, . . . , DUn, RU1, RU2, . . . , RUm, GM, or processing circuitry 910 may also be configured to, or may comprise the scheduling module 915 configured to, perform the scheduling of the packet-based synchronization messages further based on this configuration of the one or more first fronthaul network units RU1, RU2, . . . , RUm, DU1, DU2, . . . , DUn and the one or more second fronthaul network units RU1, RU2, . . . , RUm, DU1, DU2, . . . , DUn. Also, in this case, according to some embodiments, the network entity DU1, DU2, . . . , DUn, RU1, RU2, . . . , RUm, GM, or processing circuitry 910 may also be configured to, or may comprise the configuring module 914 configured to, use timing advance commands to extend the guard periods by one or more OFDM symbols.

Further, in case of having a configurable TDD split ratio between the UL and DL time periods that are occupied by TDD radio transmissions, the network entity DU1, DU2, . . . , DUn, RU1, RU2, . . . , RUm, GM, or processing circuitry 910 may, according to some embodiments, further be configured to, or may comprise the configuring module 914 configured to, configure the one or more first fronthaul network units RU1, RU2, . . . , RUm, DU1, DU2, . . . , DUn and the one or more second fronthaul network units RU1, RU2, . . . , RUm, DU1, DU2, . . . , DUn with a TDD split ratio between UL and DL time periods wherein the UL and DL time periods comprise one or more OFDM symbols that are restricted from transmissions. Here, the network entity DU1, DU2, . . . , DUn, RU1, RU2, . . . , RUm, GM, or processing circuitry 910 may also be configured to, or may comprise the scheduling module 915 configured to, perform the scheduling of the packet-based synchronization messages further based on this configuration of the one or more first fronthaul network units RU1, RU2, . . . , RUm, DU1, DU2, . . . , DUn and the one or more second fronthaul network units RU1, RU2, . . . , RUm, DU1, DU2, . . . , DUn.

According to some embodiments, the network entity DU1, DU2, . . . , DUn, RU1, RU2, . . . , RUm, GM, or processing circuitry 910 may be configured to, or may comprise the transmitting module 912 configured to, transmit configuration information to the one or more first fronthaul network units RU1, RU2, . . . , RUm, DU1, DU2, . . . , DUn and/or the one or more second fronthaul network units RU1, RU2, . . . , RUm, DU1, DU2, . . . , DUn. Also, in some embodiments, the packet-based fronthaul network 100 is full-duplex, and the packet-based synchronization messages are timestamped data packets according to a packet-based synchronization protocol, such as, e.g. PTP.

Furthermore, the embodiments for synchronizing one or more first fronthaul network units RU1, RU2, . . . , RUm, DU1, DU2, . . . , DUn with one or more second fronthaul network units RU1, RU2, . . . , RUm, DU1, DU2, . . . , DUn across a packet-based fronthaul network 100 carrying TDD radio transmissions described above may be implemented through one or more processors, such as the processing circuitry 910 in the network entity DU1, DU2, . . . , DUn, RU1, RU2, . . . , RUm, GM, depicted in FIG. 9, together with computer program code for performing the functions and actions of the embodiments herein. The program code mentioned above may also be provided as a computer program product, for instance in the form of a data carrier carrying computer program code or code means for performing the embodiments herein when being loaded into the processing circuitry 910 in the network entity DU1, DU2, . . . , DUn, RU1, RU2, . . . , RUm, GM. The computer program code may e.g. be provided as pure program code in the network entity DU1, DU2, . . . , DUn, RU1, RU2, . . . , RUm, GM, or on a server and downloaded to the network entity DU1, DU2, . . . , DUn, RU1, RU2, . . . , RUm, GM. Thus, it should be noted that the modules of the network entity DU1, DU2, . . . , DUn, RU1, RU2, . . . , RUm, GM, may in some embodiments be implemented as computer programs stored in memory, e.g. in the memory modules 920 in FIG. 9, for execution by processors or processing modules, e.g. the processing circuitry 910 of FIG. 9.

Those skilled in the art will also appreciate that the processing circuitry 910 and the memory 920 described above may refer to a combination of analog and digital circuits, and/or one or more processors configured with software and/or firmware, e.g. stored in a memory, that when executed by the one or more processors such as the processing circuitry 920 perform as described above. One or more of these processors, as well as the other digital hardware, may be included in a single application-specific integrated circuit (ASIC), or several processors and various digital hardware may be distributed among several separate components, whether individually packaged or assembled into a system-on-a-chip (SoC).

The description of the example embodiments provided herein have been presented for purposes of illustration. The description is not intended to be exhaustive or to limit example embodiments to the precise form disclosed, and modifications and variations are possible in light of the above teachings or may be acquired from practice of various alternatives to the provided embodiments. The examples discussed herein were chosen and described in order to explain the principles and the nature of various example embodiments and its practical application to enable one skilled in the art to utilize the example embodiments in various manners and with various modifications as are suited to the particular use contemplated. The features of the embodiments described herein may be combined in all possible combinations of methods, apparatus, modules, systems, and computer program products. It should be appreciated that the example embodiments presented herein may be practiced in any combination with each other.

It should be noted that the word "comprising" does not necessarily exclude the presence of other elements or steps than those listed and the words "a" or "an" preceding an element do not exclude the presence of a plurality of such elements. It should further be noted that any reference signs do not limit the scope of the claims, that the example embodiments may be implemented at least in part by means of both hardware and software, and that several "means", "units" or "devices" may be represented by the same item of hardware.

It should also be noted that the various example embodiments described herein are described in the general context of method steps or processes, which may be implemented in one aspect by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Generally, program modules may include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

The embodiments herein are not limited to the above described preferred embodiments. Various alternatives, modifications and equivalents may be used. Therefore, the above embodiments should not be construed as limiting.

ABBREVIATIONS

BMCA Best Master Clock Algorithm
CPRI Common Public Radio Interface
DCI Downlink Control Information
DL Downlink
GM Grand Master
GNSS Global Navigation Satellite System
GPS Global Positioning System
OFDM Orthogonal Frequency Division Multiplexing
OTDOA Observed Time Difference of Arrival
PTP Precision Time Protocol
PDV Packet Delay Variation
RDS Radio Dot System
RRC Radio Resource Control
SFI Slot-format Indicator
TAE Timing Alignment Error
TDD Time-Division Duplexing
UL Uplink

The invention claimed is:

1. A method performed by a network entity for synchronizing one or more first fronthaul network units with one or more second fronthaul network units across a packet-based fronthaul network carrying Time-Division Duplex, TDD, radio transmissions, the method comprising:
    obtaining information indicating uplink, UL, time periods and downlink, DL, time periods in the packet-based fronthaul network occupied by the TDD radio transmissions transmitted and/or received by the one or more second fronthaul network units over a radio interface; and
    scheduling packet-based synchronization messages for transmission between at least the one or more first fronthaul network units and the one or more second fronthaul network units over the packet-based fronthaul network, the scheduling of the packet-based synchronization messages being based on the obtained information.

2. The method according to claim 1, wherein the scheduling of the packet-based synchronization messages is performed in a UL and DL direction over the packet-based fronthaul network during time periods not occupied by UL or DL TDD radio transmissions.

3. The method according to claim 1, wherein scheduling of DL packet synchronization messages is performed in a DL direction over the packet-based fronthaul network during time periods that are not occupied by DL TDD radio transmissions, and scheduling of UL packet synchronization messages is performed in a UL direction over the packet-based fronthaul network during time periods that are not occupied by UL or DL TDD radio transmissions.

4. The method according to claim 1, in case the TDD radio transmissions are part of a Long-Term Evolution, LTE, transmission, further comprising:
    configuring the one or more first fronthaul network units and the one or more second fronthaul network units to not perform any assignments during a DwPTS part and/or transmissions during an UpPTS part in a special subframe, and
    wherein the scheduling of the packet-based synchronization messages is further based on said configuration of the one or more first fronthaul network units and the one or more second fronthaul network units.

5. The method according to claim 1, in case the TDD radio transmissions are part of a Long-Term Evolution, LTE, transmission, further comprising:
    configuring the one or more first fronthaul network units and the one or more second fronthaul network units with a special subframe having fewer DwPTS symbols and/or UpPTS symbols than a currently configured special subframe, and
    wherein the scheduling of the packet-based synchronization messages is further based on said configuration of the one or more first fronthaul network units and the one or more second fronthaul network units.

6. The method according to claim 1, in case of having a configurable TDD split ratio between the UL and the DL time periods that are occupied by the TDD radio transmissions, further comprising:
    configuring the one or more first fronthaul network units and the one or more second fronthaul network units with a TDD split ratio between the UL and the DL time periods such that one or more guard periods between the UL and the DL time periods comprise one or more OFDM symbols, and to not transmit in an n first and/or an m last of the one or more OFDM symbols of the one or more guard periods, and
    wherein the scheduling of the packet-based synchronization messages is further based on said configuration of the one or more first fronthaul network units and the one or more second fronthaul network units.

7. The method according to claim 6, wherein timing advance commands are used to extend the one or more guard periods by at least a part of an OFDM symbol.

8. The method according to claim 1, in case of having a configurable TDD split ratio between the UL and the DL time periods that are occupied by the TDD radio transmissions, further comprising:
configuring the one or more first fronthaul network units and the one or more second fronthaul network units with a TDD split ratio between the UL and the DL time periods wherein the UL and the DL time periods comprise one or more OFDM symbols that are restricted from transmissions, and
wherein the scheduling of the packet-based synchronization messages is further based on said configuration of the one or more first fronthaul network units and the one or more second fronthaul network units.

9. The method according to claim 4, wherein the configuring comprises transmitting configuration information to the one or more first fronthaul network units and/or the one or more second fronthaul network units.

10. The method according to claim 1, wherein the packet-based fronthaul network is full-duplex, and the packet-based synchronization messages are timestamped data packets according to a packet-based synchronization protocol.

11. A network entity for synchronizing one or more first fronthaul network units with one or more second fronthaul network units across a packet-based fronthaul network carrying Time-Division Duplex, TDD, radio transmissions, the network entity comprising:
a memory that stores computer executable instructions; and
processing circuitry, wherein, in response to executing the computer executable instructions, the processing circuitry is configured to:
obtain information indicating uplink, UL, time periods and downlink, DL, time periods in the packet-based fronthaul network occupied by the TDD radio transmissions transmitted and/or received by the one or more second fronthaul network units over its radio interface, and schedule packet-based synchronization messages for transmission between the network entity, the one or more first fronthaul network units and the one or more second fronthaul network units over the packet-based fronthaul network, the scheduling of the packet-based synchronization messages being based on the obtained information.

12. The network entity according to claim 11, wherein the scheduling of the packet-based synchronization messages is performed in a UL and DL direction over the packet-based fronthaul network during time periods not occupied by UL/DL TDD radio transmissions.

13. The network entity according to claim 11, wherein the scheduling of DL packet synchronization messages is performed in a DL direction over the packet-based fronthaul network during time periods that are not occupied by DL TDD radio transmissions, and the scheduling of the packet-based synchronization messages is performed in a UL direction over the packet-based fronthaul network during time periods that are not occupied by UL or DL TDD radio transmissions.

14. The network entity according to claim 11, wherein, in response to executing the computer executable instructions, the processing circuitry is further configured to, in case TDD radio transmissions are part of a Long-Term Evolution, LTE, transmission, configure the one or more first fronthaul network units and the one or more second fronthaul network units to not perform any assignments during a DwPTS part and/or transmissions during an UpPTS part in a special subframe, and the scheduling of the packet-based synchronization messages is further based on said configuration of the one or more first fronthaul network units and the one or more second fronthaul network units.

15. The network entity according to claim 11, wherein, in response to executing the computer executable instructions, the processing circuitry is further configured to, in case TDD radio transmissions are part of a Long-Term Evolution, LTE, transmission, configure the one or more first fronthaul network units and the one or more second fronthaul network units with a special subframe having fewer DwPTS symbols and/or UpPTS symbols than a currently configured special subframe, and the scheduling of the packet-based synchronization messages is further based on said configuration of the one or more first fronthaul network units and the one or more second fronthaul network units.

16. The network entity according to claim 11, wherein, in response to executing the computer executable instructions, the processing circuitry is further configured to, in case of having a configurable TDD split ratio between the UL and the DL time periods that are occupied by the TDD radio transmissions, configure the one or more first fronthaul network units and the one or more second fronthaul network units with a TDD split ratio between the UL and the DL time periods such that one or more guard periods between the UL and the DL time periods comprise one or more OFDM symbols, and to not transmit in an n first and/or an m last of the one or more OFDM symbols of the one or more guard periods, and the scheduling of the packet-based synchronization messages is further based on said configuration of the one or more first fronthaul network units and the one or more second fronthaul network units.

17. The network entity according to claim 16, wherein, in response to executing the computer executable instructions, the processing circuitry is further configured to use timing advance commands to extend the one or more guard periods by the one or more OFDM symbols.

18. The network entity according to claim 11, wherein, in response to executing the computer executable instructions, the processing circuitry is further configured to, in case of having a configurable TDD split ratio between the UL and the DL time periods that are occupied by the TDD radio transmissions, configure the one or more first fronthaul network units and the one or more second fronthaul network units with a TDD split ratio between the UL and the DL time periods wherein the UL and the DL time periods comprise one or more OFDM symbols that are restricted from transmissions, and the scheduling of the packet-based synchronization messages is further based on said configuration of the one or more first fronthaul network units and the one or more second fronthaul network units.

19. The network entity according to claim 14, wherein, in response to executing the computer executable instructions, the processing circuitry is further configured to transmit configuration information to the one or more first fronthaul network units and/or the one or more second fronthaul network units.

20. The network entity according to claim 11, wherein the packet-based fronthaul network is full-duplex, and the packet-based synchronization messages are timestamped data packets according to a packet-based synchronization protocol.

* * * * *